United States Patent Office 3,505,291
Patented Apr. 7, 1970

3,505,291
PROCESS FOR PREPARING HIGH MOLECULAR WEIGHT POLYMERS OF FORMALDEHYDE
Guido Galiazzo, Padova, Gerolamo Gaggia, Verolanuova, and Luigi Mortillaro, Padova, Italy, and Silvio Bezzi, deceased, late of Padova, Italy, by Ladislava Viller Bezzi, legal representative, Padova, Italy, assignors to Montecatini Edison S.p.A., Milan, Italy
No Drawing. Continuation-in-part of application Ser. No. 168,220, Jan. 23, 1962. This application July 26, 1966, Ser. No. 629,034
Claims priority, application Italy, Jan. 27, 1961, 1,456/61; Sept. 8, 1961, 16,113
(Filed under Rule 47(a) and 35 U.S.C. 116)
Int. Cl. C08g 1/20, 1/02
U.S. Cl. 260—67  7 Claims

ABSTRACT OF THE DISCLOSURE

Preparing high molecular weight polyoxymethylenes from concentrated formaldehyde solutions by topochemical reaction in presence of alkali metal salt of lower aliphatic carboxylic acid in concentration of from greater than 20% to saturation, at pH in excess of 8 and temperature less than about 50° C. High molecular weight crystalline polyoxymethylene in orthorhombics form produced by foregoing process.

This case is a continuation-in-part of copending application Ser. No. 168,220 filed Jan. 23, 1962, now abandoned.

The present invention relates to the preparation of high molecular weight polyoxymethylene-dihydroxides by topochemical reaction on polyoxymethylenes having either a low or a high degree of polymerization, which polyoxymethylenes are present as a solid phase in an aqueous formaldehyde solution.

The formaldehyde polymers obtained by this process have a thermal stability which increases with increasing molecular weight. Such formaldehyde polymers have tenacity, elasticity and moldability characteristics which render them useful as plastics.

The properties of such formaldehyde resins as thermoplastic resins can be considerably improved by transforming the polyoxymethylene-dihydroxides into their acetic esters according to the method described by Staudinger et al. (Ann. 474, 174–175, 1929).

It has been established that solutions having a concentration higher than those of the liquid phase in equilibrium at a given temperature are supersaturated with respect to one or more polyoxymethylenes and that such solution can be divided in two groups: unstable and metastable. Unstable solutions are those solutions from which a spontaneous separation of polyoxymethylenes takes place; their concentration is higher than the "stability limit" concentration. Metastable solutions are those solutions having concentrations lower than the stability limit but higher than those of the liquid phase in the heterogeneous systems in equilibrium. From these metastable solutions the spontaneous separation of polyoxymethylenes does not occur. However, if solid polyoxymethylene polymers are contacted with such solutions, such polymers undergo chain growth through topochemical reaction with monomeric formaldehyde in the solution. In addition, low and average molecular weight polyoxymethylenes (with respect to which the solution is supersaturated) are separated onto single crystals of the solid phase, and also new crystalline seeds are formed. The "total polymerization rate" is defined as the amount of polyoxymethylenes (grams) separated from the solution per hour per 100 g. of pre-existing solid phase.

The preparation of high molecular weight polyoxymethylenes from aqueous formaldehyde solutions is already described in U.S. Patent 3,000,861. The operating conditions of the process described in this patent may be summarized as follows:

(1) *Temperature:* higher than 60° C., preferably higher than 80° C.;

(2) *Catalysts:* (a) acid substances in sufficient concentration to produce a pH of 0.5–3.0; (b) acid/base combinations in such an amount to produce a pH of 3.5–8.0; (c) basic substances resistant to hydrolysis in an amount sufficient to produce a pH of 8–11. Tertiary amines are preferred in this type of catalyst system while inorganic hydroxides are stated to be inoperable.

(3) *Process conditions:* the process is carried out in two stages. In the first stage polyoxymethylene seed particles are formed while in the second stage the molecular weight of the seed particles is increased and high molecular weight polyoxymethylene is recovered. The process is carried out in a discontinuous way, i.e. batchwise.

In accordance with the process of the present invention, high molecular weight polyoxymethylenes are obtained by preparing a suspension comprising (I) a polyoxymethylene and (II) an aqueous solution of formaldehyde containing an alkali metal salt of a lower aliphatic carboxylic acid, in concentration higher than 20% by weight and at most equal to concentration corresponding to saturation, based on the weight of the solution. The suspension is maintained at a temperature lower than 50° C. (preferably between 20 and 40° C.) and at a pH higher than 8 (preferably between 8.5 and 12). The concentration of the formaldehyde in the solution must be between the equilibrium concentration and the stability concentration, as defined by S. Bezzi and A. Iliceto on "La Chimica e l'Industria 33, 429–36 (1951). In practice, with the operating conditions of the process of the present invention, the formladehyde concentration in the solution is generally lower than 25% by weight.

The following materials are added to the suspension at short intervals or continuously in order to maintain the composition of the solution constant with time:
(a) an aqueous concentrated solution of $CH_2O$ to replace the formaldehyde which has polymerized and that which has been lost by Cannizzaro reaction,
(b) an alkali metal hydroxide in an amount sufficient to maintain the pH at the desired value,
(c) an alkali metal salt of a lower aliphatic carboxylic acid, That is, the three reactants (a, b and c) are added in such relative amounts as to maintain constant with time the composition of the liquid phase, is pH and the solid/liquid ratio of the system.

Although the aqueous solution of $CH_2O$ may have a lower concentration, it is preferred to employ solutions containing at least 40% by weight of $CH_2O$ so as to maintain a high solid-to-liquid ratio in the reaction system, thereby obtaining a higher yield of polymer for a given reactor volume.

As the alkali metal salts of a lower carboxylic aliphatic acid there may be used, e.g., sodium formate, sodium acetate or potassium formate. Concentrations of the salt lower than 20% by weight, based on the weight of the solution, may be used. It is, however, preferred to operate with concentrations higher than 20% in order to obtain high molecular weights with high polymerization rates. The alkali metal hydroxides which are used need not necessarily have the same cation as that of the salt.

The pH should be higher than 8, because at lower pH high molecular weights are not obtained. It is, however, preferred that the pH be lower than 12 in order to reduce the losses due to the Cannizzaro side reaction to practically negligible amounts.

Under the conditions of the process of the present invention, as a consequence of the contemporaneous formation of new polymer seeds and of the increase of molecular weight, an equilibrium composition of the solid phase is reached after a certain time. This equilibrium condition of composition indefinitely remains constant with time. This fact is obviously very advantageous since it permits the reaction to be carried out as a continuous process and, further, results in polymer products having a virtually uniform composition.

In summary, the operating conditions of the process of the present invention are as follows.

(1) *Temperature:* lower than 50° C., preferably between 20 and 40° C.;

(2) *Catalysts:* alkali metal salts of lower aliphatic carboxylic acids (which, as known, may hydrolize), used in the presence of an alkali metal hydroxide (in order to maintain a pH higher than 8);

(3) *Process conditions:* The process is carried out in a single stage in which the formation of polymer seeds and the increase of molecular weight take place contemporaneously. The process is carried out continuously by continually replenishing the reactants and removing the polymer product.

It is worth noting that in the process of U.S. Patent 3,000,861 a decrease of the temperature to values below 60° C. causes a decrease of the polymerization rate. By contrast, in the process of the present invention the best results are obtained at temperatures below 50° C. This can be seen from Table 1 below, wherein at temperatures of 50° C. or above a marked decrease of the molecular weight of the obtained polymer product is observed. The optimum temperature conditions to be employed in the process of the present invention are between 30 and 40° C. whereas employing temperatures of U.S. Patent 3,000,861 (60° C. or higher) would have a deleterious effect.

TABLE 1

| Temperature, °C.: | Total polymerization rate [1] | $\eta$ red of the obtained polymer |
|---|---|---|
| 20 | 0.75 | 0.8 |
| 35 | 1.4 | 0.8 |
| 50 | 1.4 | 0.1 |
| 60 | 1.4 | 0.1 |

[1] The total polymerization rate is defined as the amount of polymer in grams separated from the solution per hour and per 100 g. of existing solid phase.

From about 2.1 to about 60 times greater reactor volume is necessary for producing the same amount of polymer, according to U.S. Patent 3,000,861, than in the process according to the present invention. In addition, the amount of aldehyde necessary to produce the same amount of polymer is from about 1.6 times to about 47 times greater in the process of said U.S. Patent 3,000,861. Furthermore, the loss of formaldehyde due to the Cannizzaro reaction, at equal polymer production rates is from about 8.5 times to about 650 times higher in the process of the said U.S. Patent. Moreover, the time necessary to produce the same amount of polymer is considerably higher, about 1.8 times.

As a consequence of the slight exothermic character of the reaction, at the temperatures and with the small volume of the reactants of the process of the present invention, little or no external heat is required by the process of the present invention whereas in the process of U.S. Patent 3,000,861 considerable amounts of external heat must be supplied.

A comparison of reactor volumes, reaction times, $CH_2O$ losses and the amounts of formaldehyde used per 100 g. of polymer produced is shown in Table 2.

TABLE 2

| | Volume of the reactor (liters) | | Amount of $CH_2O$ (kilograms) | | Loss of $CH_2O$ (grams) | | Time necessary (hours) | |
|---|---|---|---|---|---|---|---|---|
| | A | B | A | B | A | B | A | B |
| Minimum values | 0.56 | 3.36 | 0.26 | 1.33 | 1 | 17.3 | 24.0 | 23.0 |
| Maximum values | 1.60 | 33.6 | 0.83 | 12.18 | 2.2 | 656 | 24.0 | 71.8 |
| Average values | 1.1 | 14.1 | 0.56 | 5.98 | <2 | 148 | 24.0 | 42.6 |

A = process of the present invention.
B = process of U.S. Patent 3,000,861.

The comparative data presented in Table 2 does not take into account the nucleation steps of the process of U.S. Patent 3,000,861 inasmuch as these steps relate to the preparation of a pre-polymer whose molecular weight must then be increased. Thus, only the principal polymerization step itself was analyzed.

By operating under the conditions of the present invention there are obtained products which, when subjected to X-ray examination, have shown a crystalline structure different from that of the other formaldehyde polymers heretofore described in the literature. These polymers, having the new crystalline form, are very stable and are very useful for the preparation of shaped articles, films, fibers, etc. using shaping techniques well known in the art.

In the drawings, FIGURES 1 and 2 present infrared absorption spectra of polyoxymethylenes of the instant and prior art types, respectively, examined in the powder state in paraffin oil.

A comparative examination of the two spectra clearly reveals different absorption characteristics in the vibration complex involving the C—O and C—H vibrations.

In Table 3 are shown some physical and structure characteristics which differentiate the two types of polymers.

TABLE 3.—COMPARISON OF THE PRIOR ART TYPE OF POLYOXYMETHYLENES WITH THE NEW TYPE

| | Old Type | | New Type | |
|---|---|---|---|---|
| Density (determined) g./cm.$^3$ 20° C | 1.43 | | 1.525 | |
| Density (calculated on the basis of the elementary cell) | 1.506 | | 1.537 | |
| X-ray diffraction | dA. | $J/J_1$ | dA. | $J/J_1$ |
| Most intense peak | 3.88 | 100 | 4.05 | 100 |
| | 2.60 | 25 | 3.83 | 41 |
| | 1.89 | 10 | 2.67 | 27 |
| Lattice constants | a=b=4.46 A c=17.3 A | | a=4.77 A. b=7.65 A. c=3.56 A. | |
| Crystalline system | Trigonal ($P3_1$) or ($P3_2$) | | Orthorhombic ($P2_12_12_1$) | |
| Chain number per cell | 1 | | 2 | |
| Monomeric units along the c axis | 9 | | 2 | |

We have also surprisingly found that with given prefixed kinetics of formation of polyoxymethylenes, their degree of polymerization varies in an irregular manner with varying temperature, the optimum temperature being about 35° C. At this temperature there is also the possibility of remarkably increasing the formation kinetics without appreciably decreasing the molecular complexity of the resulting polymers, which decreases, on the contrary, do take place at much higher (or lower) temperatures, for instance 50° or 60° C. This unexpected behaviour is illustrated by the data reported in Table 4.

TABLE 4

[Variation in the molecular weight and in the proportion of crystalline orthorhombic form [1] by varying the total polymerization rate at constant temperature (T=35° C.; pH=9.00)]

| Total Polymerization rate, g./h. | Characteristics of the Polymer | |
|---|---|---|
| | $\eta$ red | Orthorhombic form, percent |
| 0.7 | 1.10 | 80 |
| 1.4 | 0.80 | 76 |
| 3.0 | 0.65 | 80 |

[1] The data were determined after having reached equilibrium conditions (after 9 days from the beginning of the test).

When the solid phase consists exclusively or prevailingly of the new crystalline orthorhombic form (which occurs up to a temperature of about 35° C.), two different advantages can be obtained by increasing the temperature from 0° to 35° C.;

(1) an increase in the molecular complexity, while keeping constant the rate of production of polyoxymethylenes (Table 5);

(2) an increase in the production rate, while keeping constant the molecular weight (Table 6).

TABLE 5

Increase of the molecular weight of the polymer with temperature at substantially constant polymerization rate (0.7–0.75).

| Temperature, ° C. | $\eta$ red of the obtained polymer |
|---|---|
| 20 | 0.8 |
| 35 | 1.1 |

Increase of the total polymerization rate with temperature at substantially constant molecular weight.

TABLE 6

| Temperature, ° C.: | Total polymerization rate | $\eta$ red of the obtained polymer |
|---|---|---|
| 20 | 0.7 | 0.8 |
| 35 | 1.4 | 0.8 |

When the temperature is increased above 35° C., the ratio of the orthorhombic to the trigonal form is quickly changed in favour of the trigonal form. Therefore, with a constant production rate the temperature increase causes a very great decrease in the molecular complexity as shown (by the $\eta$ red data) in Table 1.

The process of the present invention makes it possible to effect the continuous production of polymeric products whose characteristics are determined only by the selected operating conditions and remain constant with time. The continuous process can be performed in accordance with either of the following two procedures:

(1) The concentrated formaldehyde solution is added continuously, its flow-rate being regulated so as to maintain the preestablished constant concentration in the system. This must be carried out under analytical control since the reaction kinetics vary within narrow limits as a function of small variations of pH, concentration, etc.

(2) The concentrated formaldehyde solution is added continuously with constant flow-rates in amounts corresponding to the desired separation rate of new polymer produced in the system. Under these latter conditions the small variations in kinetics cause a variation in the concentration of the formaldehyde in solution, which variation tends to counterbalance variations in kinetics. This second method (whereby a constant total polymerization rate is maintained) is preferred since there is no need for periodic aanlytical controls.

Another operative feature which may be employed in the process of our invention for greater efficiency comprises:

(a) continuously discharging from the polymerization reactor the suspension of polymer in the formaldehyde solution;

(b) continuously separating the polymer from the solution by filtration, centrifuging, decantation or by any other suitable method;

(c) enriching the effluent aqueous solution with formaldehyde by introducing the effluent solution directly into an absorption column in which the formaldehyde vapors leaving the reactor of the formaldehyde synthesis are recovered;

(d) continuously introducing the solution which has thus been enriched with formaldehyde into the formaldehyde polymerization reactor.

The following examples are intended to further illustrate our invention without limiting the scope thereof.

The experiments have been carried out using as starting materials polyoxymethylenes having a well defined $\eta$ red and a known content of orthorhombic crystalline form.

The experiments, however, can be carried out with any other type of starting polyoxymethylene, however prepared. It is obvious that in such case the time required for reaching the equilibrium condition will vary. In particular, a starting polyoxymethylene having a lower molecular weight will require a higher adjustment time. In each experiment samples were taken periodically in order to determine (by means of viscosity measurements) the variations, if any, in the molecular weight of the polyoxymethylenes separated. For these determinations each sample was washed with an amount of water corresponding to twice the weight of the sample and then with an amount of benzene equal to the weight of the sample.

After drying for 12 hours at 43° C. under 15 mm. of pressure, the product was acetylated in a sealed vial with ten times its weight of acetic anhydride (free of acetic acid), while keeping said vial in an oil bath heated to 170° C. The vial was kept therein until the polyoxymethylene was dissolved. Agitation for 3 to 5 minutes is generally sufficient. By this method a yield of acetylated product higher than 90% was obtained.

The determination of the molecular complexity of the polymer was carried out by determining the viscosity at 150° C. in dimethylformamide (DMF) solution). In the tables and in the illustrative examples the reported reduced viscosity values were determined in dimethylformamide at 150° C. with concentrations of 0.5 g.% ($\eta$ red 0.5), the reduced viscosity ($\eta$ red) being defined as follows:

$$\eta \text{ red} = \frac{\eta \text{ specific}}{c} = \frac{\eta \text{ rel}-1}{c}$$

(in which $c$=concentration, g./100 cc.).

Unless otherwise indicated, the reported pH values were determined with indicator papers "Indikal pH Papiere" produced by the VEB Berlin-Chemie (Berlin-Germany).

EXAMPLE 1

2 liters (2.7 kg.) of a suspension of polyoxymethylene in an aqueous formaldehyde solution were introduced into a 5-liter reactor provided with a mechanical agitator and immersed in a thermostatic bath kept at 20° C. The weight ratio of the suspension was 1 part of solid per 2 parts of solution. The solution contained 40% by weight of sodium formate, 10% by weight of $CH_2O$, and 50% by weight of water. For this water/formate ratio at 20° C., the $CH_2O$ equilibrium concentration is 8.7% by weight.

To this suspension, 0.4 kg./day of 50% formaldehyde solution were added continuously together with powdered sodium formate and 20% sodium hydroxide in such amounts as to keep the pH at 10 and the sodium ions at a concentration of 13.5% by weight. After 24 hours, an amount of suspension corresponding to the amount of added substances was withdrawn.

The addition of the concentrated aldehyde solution was regulated by periodic titrations (every 2 hours) so as to keep the concentration in the solution at 9.75±0.25% by weight (1% higher than the equilibrium concentration).

By repeating these operations every day, equilibrium conditions were reached within a short time, which equilibrium remains practically unaltered indefinitely, as is shown, e.g., in Table 7 for a period of 40 days.

The variations in the total polymerization rate result from various experimental factors, e.g., slight variations in the pH values, in the aldehyde concentration, in the formate concentration, in the agitation speed, etc. The slight variations in the specific viscosity are probably also related to these causes.

TABLE 7

| Days elapsed | | Total polymerization rate | η red |
|---|---|---|---|
| Arrangement Period | 0 | | 0.44 |
| | 4 | 0.570 | 0.44 |
| | 8 | 0.520 | 0.56 |
| | 12 | 0.490 | 0.79 |
| Equilibrium period | 14 | 0.600 | 0.82 |
| | 17 | 0.560 | 0.79 |
| | 22 | 0.650 | 0.85 |
| | 30 | 0.610 | 0.80 |
| | 38 | 0.620 | 0.84 |
| | 46 | 0.720 | 0.82 |
| | 54 | 0.705 | 0.80 |

EXAMPLE 2

This test was carried out under the experimental conditions of Example 1 (T=20° C., pH=10, sodium formate conc.=40%, etc.) the only variation being that, while in Example 1 the formaldehyde additions were regulated so as to keep constant the concentration thereof in the reactor solution, in this example the additions were regulated so as to keep constant the total production rate of the polymer at the value of 0.750 g. per hour per 100 g. of pre-existing solid product.

Since this value is slightly higher than that of Example 1, the aldehyde concentration in solution reaches a slightly higher value (9.8%) at equilibrium reaction conditions and the molecular weights attained are slightly lower. This test was continued for 18 days under equilibrium conditions. The results are reported in Table 8.

TABLE 8

| Days elapsed | | Total polymerization rate | η red |
|---|---|---|---|
| Arrangement period | 0 | | 0.60 |
| | 2 | 0.745 | 0.65 |
| | 5 | 0.722 | 0.73 |
| Stationary period | 7 | 0.750 | 0.75 |
| | 10 | 0.750 | 0.77 |
| | 14 | 0.730 | 0.78 |
| | 17 | 0.710 | 0.77 |
| | 21 | 0.750 | 0.79 |
| | 23 | 0.750 | 0.81 |

EXAMPLE 3

2 kg. of a suspension consisting of 600 g. of polyoxymethylene and 1,400 g. of an aqueous solution having the following composition:

| | Percent |
|---|---|
| Sodium formate | 37.8 |
| $CH_2O$ | 11.7±0.16 | where introduced into a 2-liter reactor provided with an agitator and immersed in a thermostatic bath at 35° C.

The starting polyoxymethylene used in this test had the following characteristics:

η red=0.76
Orthorhombic crystalline form (determined by X-ray examination)=61%

To the suspension were added 22.3 g. of a 52.5% (by weight) $CH_2O$ solution and 7.8 g. of powdered sodiumformate. The additions were effected every two hours. In addition, a NaOH solution was added in sufficient amount to keep the pH of the suspension at about 9.0 for entire duration of the test (about 0.58 g./h. of 10 N NaOH solution).

370 g. of suspension were discharged from the reactor every 24 hours. From this suspension, after filtering, washing and drying, about 109 g. of polyoxymethylene, corresponding to about 0.7 g. of polymer per hour per 100 g. of pre-existing solid polymer, were obtained.

The test was stopped after 42 days. The amount of polymer obtained per day was practicaly constant. The variation of the characteristics of the polymer with time is reported in Table 9.

TABLE 9

[pH=9.0±0.2 (Indikal papers); 10.0 (pH-meter)]

| Days elapsed | η red | Orthorhombic percent crystalline form |
|---|---|---|
| 0 | 0.76 | 61 |
| 6 } Adjustment period | 0.66 | 67 |
| 9 | 1.12 | 73 |
| 13 | 1.10 | |
| 17 | 1.02 | |
| 21 | 1.11 | |
| 24 | 1.14 | 81 |
| 28 | 1.11 | |
| 32 | 1.00 | |
| 35 | 1.05 | 98 |
| 38 | 1.11 | 94 |
| 42 | 1.05 | 96 |

EXAMPLE 4

2 kg. of a suspension consisting of 575.6 g. of polyoxymethylene and 1,424.4 g. of an aqueous suspension having the following composition (by weight):

| | Percent |
|---|---|
| Sodium formate | 37.2 |
| $CH_2O$ | 13.3±0.2 | were introduced into a 2-liter reactor provided with an agitator and immersed in a thermostatic bath at 35° C.

The starting polyoxymethylene used in this experiment had the following characteristics:

η red=0.81
Orthorhombic crystalline form (determined by X-ray examination)=82%

To the suspension were added, every hour, 24 g. of a 52.5% $CH_2O$ solution and 8.6 g. of powdered sodium formate. In addition, a NaOH solution was added in sufficient amount to keep the pH of the suspension at about 9 for the entire duration of the run (about 0.36 g./h. of a 10 H NaOH solution). 792 g. of suspension were discharged from the reactor every 24 hours. From this suspension, after filtering, washing and drying, about 228 g. of polyoxymethylene, corresponding to 1.4 g. of polymer per hour per 100 g. of pre-existing solid polymer, were obtained. The test was stopped after 30 days. The amount of polymer obtained each day was practically constant. The variations in the characteristics of the polymer with time are reported in Table 10.

TABLE 10

[Variation with time in the characteristics of the polyoxymethylenes of Example 4.]

| | Characteristics of Polyoxymethylene | |
|---|---|---|
| Days elapsed: | η red | Orthorhombic crystalline form, percent |
| 0 | 0.81 | 82 |
| 2 | 0.71 | 82 |
| 6 | 0.78 | 73 |
| 9 | 0.80 | 76 |
| 13 | 0.77 | 92 |
| 16 | 0.79 | |
| 20 | 0.72 | 94 |
| 24 | 0.81 | 88 |
| 30 | 0.80 | 90 |

EXAMPLE 5

2 kg. of a suspension consisting of 523 g. of polyoxymethylene and 1477 g. of an aqueous solution having the following composition:

| | Percent |
|---|---|
| Sodium formate | 44 |
| $CH_2O$ | 12±0.3 | were introduced into a 2-liter reactor provided with an agitator and immersed in a thermostatic bath at 35° C.

The starting polyoxymethylene used in this test has the following characteristics:

η red=0.55
Orthorhombic crystalline form (determined by X-ray examination)=87%

To the suspension there were continuously added 57.5 g./h. of a 52.5% formaldehyde solution. In addition, 27 g. of powdered sodium formate were added every hour, along with sufficient NaOH solution (about 1.6 g. of 10 N NaOH solution per hour) to keep the pH of the suspension at about 9.7 for the entire run.

A total of 2.073 kg. of suspension were discharged from the reactor every 24 hours. From this suspension, after filtering, washing and drying, about 540.4 g. of polyoxymethylene (corresponding to 3 g. of polymer per hour per 100 g. of pre-existing solid polymer) were obtained.

The experiment was stopped after 11 days. The amount of polymer obtained each day was practically constant. Variations in the characteristics of the polymer with time are reported in Table 11.

TABLE 11
[Variations with time in the characteristics of the polyoxymethylene of Example 5.]

| | Characteristics of Polyoxymethylene | |
|---|---|---|
| | η red | Orthorhombic crystalline form, percent |
| Days elapsed: | | |
| 0 | 0.55 | 87 |
| 3 | 0.68 | 77 |
| 5 | 0.66 | 77 |
| 6 | 0.65 | 85 |
| 9 | 0.65 | 80 |
| 11 | 0.64 | 82 |

EXAMPLE 6

2 kg. of a suspension consisting of 449 g. of polyoxymethylene and 1551 g. of an aqueous solution having the following composition:

| | Percent |
|---|---|
| Potassium formate | 41.1 |
| $CH_2O$ | 15 | were introduced into a 2-liter reactor provided with stirrer and kept at 35° C.

The polyoxymethylene used as as starting material had the following characteristics:

η red=0.77
Orthorhombic crystalline form (determined by X-ray examination)=80

To the suspension having the above composition the following substances were added every hour after removal of an equal amount of suspension: aqueous $CH_2O$ solution having a concentration of 50% by—

| | G. |
|---|---|
| Weight | 19.1 |
| Solid potassium formate | 8.9 | an amount of KOH sufficient to maintain the pH at about 9.7 during the reaction (about 0.2 g. of 40% KOH solution every hour).

670 g. of suspension were discharged from the reactor every 24 hours. About 150 g. of polyoxymethylene were obtained after filtration, washing and drying, corresponding to 1.4 g. of polymer per hour per 100 g. of pre-existing solid polymer.

The reaction was stopped after 30 days: the amount of polymer obtained each day was practically constant. The variations of the polymer characteristics with time are reported in Table 12.

TABLE 12

| | Characteristics of Polyoxymethylene | |
|---|---|---|
| | η red | Orthorhombic crystalline form, percent |
| Days elapsed: | | |
| 0 | 0.77 | 80 |
| 3 | 0.68 | 69 |
| 5 | 0.72 | 59 |
| 8 | 0.75 | 67 |
| 10 | 0.75 | 77 |
| 13 | 0.77 | 80 |
| 20 | 0.80 | 81 |
| 23 | 0.81 | 80 |
| 27 | 0.80 | 82 |
| 30 | 0.79 | 79 |

EXAMPLE 7

2 kg. of a suspension consisting of 535 g. of polyoxymethylene and 1465 g. of an aqueous solution having following composition:

| | Percent |
|---|---|
| Sodium acetate | 31.5 |
| $CH_2O$ | 16 | were nitroduced into a 2-liter reactor provided with stirrer and kept at 35° C.

The polyoxymethylene used as starting material had following characteristics:

η red=0.77
Orthorhombic crystalline form (determined by X-ray examination)=80%

To the suspension having the above composition the following ingredients were added every hour after removal of an equal amount of suspension:

| | G. |
|---|---|
| 50% aqueous solution of $CH_2O$ | 21.3 |
| Solid sodium acetate | 6.4 |

NaOH was then added in an amount sufficient to maintain the pH of the suspension at about 9.7 during the reaction (about 0.2 g. of 10 N NaOH solution every hour).

673 g. of suspension were discharged from the reactor every 24 hours. About 180 g. of polyoxymethylene were obtained after filtration, washing and drying, corresponding to 1.4 g. of polymer per hour and per 100 g. of pre-existing solid polymer.

The reaction was stopped after 28 days. The amount of polymer obtained each day was practically constant. The variations of the polymer characteristics with time are shown in Table 13.

TABLE 13

| | Characteristics of the Polymer | |
|---|---|---|
| | η red | Orthorhombic crystalline form, percent |
| Days of reaction: | | |
| 0 | 0.77 | 80 |
| 3 | 0.65 | 60 |
| 5 | 0.60 | 50 |
| 8 | 0.50 | 50 |
| 10 | 0.55 | 60 |
| 14 | 0.57 | 65 |
| 18 | 0.56 | 67 |
| 23 | 0.57 | 66 |
| 28 | 0.58 | 68 |

EXAMPLE 8

2 kg. of a suspension consisting of 474.2 g. of polyoxymethylene and 1525.8 g. of an aqueous solution having following composition:

| | Percent |
|---|---|
| Sodium formate | 44 |
| $CH_2O$ | 12 | were introduced into a 2-liter reactor provided with stirrer and kept at 40° C.

The polyoxymethylene used as starting material had following characteristics:

$\eta$ red = 0.52

Orthorhombic crystalline form (determined by X-ray examination) = 83%.

To the suspension having the above composition the following ingredients were added every hour after removal of an equal amount of suspension:

|  | G. |
|---|---|
| 50% aqueous solution of $CH_2O$ | 39.7 |
| Solid sodium formate | 19.8 |

NaOH was then added in an amount sufficient to maintain the pH of the suspension at about 9.5 during the reaction (about 1.5 g. of 10 N NaOH solution every hour).

1385 g. of suspension were discharged from the reactor every 24 hours. About 325 g. of polyoxymethylene were obtained after filtration, washing and drying, corresponding to 3 g. of polymer per hour per 100 g. of pre-existing solid polymer.

The experiment was stopped after 17 days. The amount of polymer obtained each day was practically constant.

Variations in the characteristics of the polymer with time are reported in Table 14.

TABLE 14

[Variations with time in the characteristics of polyoxymethylene obtained according to Example 8.]

| | Characteristics of Polyoxymethylene | |
|---|---|---|
| | $\eta$ red | Orthorhombic crystalline form, percent |
| Days elapsed | | |
| 0 | 0.52 | 83 |
| 3 | 0.57 | 71 |
| 7 | 0.60 | 71 |
| 10 | 0.63 | 79 |
| 14 | 0.64 | 79 |
| 17 | 0.62 | 78 |

The following Examples 9 and 10 are presented for comparison purposes to show that in the polymerization process of the present invention the use of temperatures of 50° C. or higher leads to polymerizates having extremely low molecular weights which are of no practical interest.

EXAMPLE 9

2 kg. of a suspension consisting of 450 g. of polyoxymethylene and 1550 g. of an aqueous solution having the following composition:

|  | Percent |
|---|---|
| Sodium formate | 35.1 |
| $CH_2O$ | 18.4 | were introduced into a 2-liter reactor provided with an agitator and immersed in a thermostatic bath at 50° C.

The starting polyoxymethylene used in this test had the following characteristics:

$\eta$ red = 0.75

Orthorhombic crystalline form (determined by X-ray examination) = 90%.

To this suspension there were added every hour 24 g. of a 52.5% $CH_2O$ solution and 8.6 g. of powdered sodium formate. Additionally, an amount of NaOH was added sufficient to keep the pH at about 9 for the entire test period (about 1.37 g./h. of 10 N NaOH solution). 810 g. of suspension were discharged from the reactor every 24 hours. From the suspension, after filtering, washing and drying, about 170 g. of polyoxymethylene (corresponding to 1.4 g. of polymer per hour per 100 g. of pre-existing solid polymer( were obtained. The experiment was stopped after 12 days. The amount of polymer obtained each day was practically constant. Variations with time in the characteristics of the polymer are reported in Table 15.

TABLE 15

Variations with time in the characteristics of polyoxymethylenes obtained according to Example 9.]

| | Characteristics of polyoxymethylene | |
|---|---|---|
| | $\eta$ red | Percent of orthorhombic crystalline form |
| Days elapsed: | | |
| 0 | 0.75 | 90 |
| 3 | 0.36 | 43 |
| 6 | 0.23 | 28 |
| 9 | 0.17 | 15 |
| 12 | 0.10 | 5 |

EXAMPLE 10

2 kg. of a suspension consisting of 406.6 g. of polyoxymethylene and 1593.4 g. of an aqueous solution having the following composition:

|  | Percent |
|---|---|
| Sodium formate | 34 |
| $CH_2O$ | 20.95±0.06 | were introduced into a 2-liter reactor provided with an agitator and immersed in a thermostatic bath at 60° C.

The starting polyoxymethylene used for this test had the following characteristics:

Orthorhombic crystalline form (determined by X-ray examination) = 95%

$\eta$ red = 0.73

To the suspension there were added every hour 23.3 g. of a 52.5% $CH_2O$ solution and 8.3 g. of powdered sodium formate. NaOH was added in an amount sufficient to keep the pH of the suspension at about 9 for the whole test (about 1.40 g./h. of 10 N NaOH solution). Every 24 hours 794 g. of suspensions were discharged from the reactor. From this suspension, after filtering, washing and drying, about 161 g. of polyoxymethylene were obtained (corresponding to 1.4 g. of polymer per hour per 100 g. of pre-existing solid polymer).

The test was stopped after 12 days. The amount of polymer obtained every day was practically constant. The variations with time in the characteristics of the polymer were reported in Table 16.

TABLE 16

[Variations with time in the characteristics of the polyoxymethylene of Example 10.]

| | Characteristics of polyoxymethylenes | |
|---|---|---|
| | $\eta$ red | Orthorhombic crystalline form, percent |
| Days elapsed: | | |
| 0 | 0.73 | 95 |
| 2 | 0.53 | 55 |
| 6 | 0.28 | 20 |
| 9 | 0.12 | 5 |
| 12 | 0.10 | 1 |

Variations can of course be made without departing from the spirit of our invention.

Having thus described our invention, what it is desired to secure and claim by Letters Patent is:

1. A process for the synthesis of high molecular weight polyoxymethylenes from an aqueous formaldehyde solution having a concentration between the equilibrium concentration and the stability concentration by topochemical reaction on polyoxymethylenes present in said solution as the solid phase, said process comprising carrying out the reaction in the presence of an alkali salt of a lower aliphatic carboxylic acid, the concentration of said salt in said aqueous formaldehyde solution being from about 30 to about 40 percent by weight and at most equal to the concentration corresponding to saturation, the pH being maintained between about 8.5 and 12, at a temperature of between about 0° C. and 40° C., while maintaining substantially constant the formaldehyde concentration in the aqueous solution, the concentration of the carboxylic acid salt, and the pH.

2. The process of claim 1 wherein said carboxylic acid salt is selected from the group consisting of sodium formate, potassium formate and sodium acetate.

3. The process of claim 1 wherein said formaldehyde concentration, organic acid salt concentration, and the pH are maintained substantially constant by periodic addition to the reaction mixture of said organic acid salt, an alkali metal hydroxide and a concentrated aqueous solution of formaldehyde, and periodically discharging therefrom a substantially equal weight of polyoxymethylene and dilute aqueous formaldehyde solution.

4. The process of claim 3 wherein said formaldehyde concentration, organic acid salt concentration, and pH are maintained substantially constant by continually feeding a concentrated aqueous solution of $CH_2O$, sodium formate and sodium hydroxide and continually discharging polyoxymethylene and dilute aqueous $CH_2O$ solution.

5. The process of claim 4 wherein the diluted $CH_2O$ solution which is continuously discharged is enriched with $CH_2O$ by direct absorption of vapors coming from the synthesis of $CH_2O$ and the solution thus enriched with $CH_2O$ is fed continuously to the zone of polymerization.

6. The process of claim 1 wherein the reaction temperature is between about 20° C. and 40° C.

7. The process of claim 1 carried out at a temperature of 35° C. to thereby obtain a polymer prevailingly in the orthorombic crystalline form, with a considerable increase in the kinetics of formation and without substantial decrease in the molecular complexity of the polymer.

References Cited

Hammer et al., Journal of Applied Polymer Science, vol. 1, No. 2, (1959), pp. 169–170 relied on.

Alsup et al., Ibid., p. 191 relied on.

WILLIAM H. SHORT, Primary Examiner

L. M. PHYNES, Assistant Examiner